E. C. WOOD AND H. J. W. FAY.
DIAPHRAGM MOUNTING.
APPLICATION FILED NOV. 12, 1917.

1,401,024.

Patented Dec. 20, 1921.
5 SHEETS—SHEET 3.

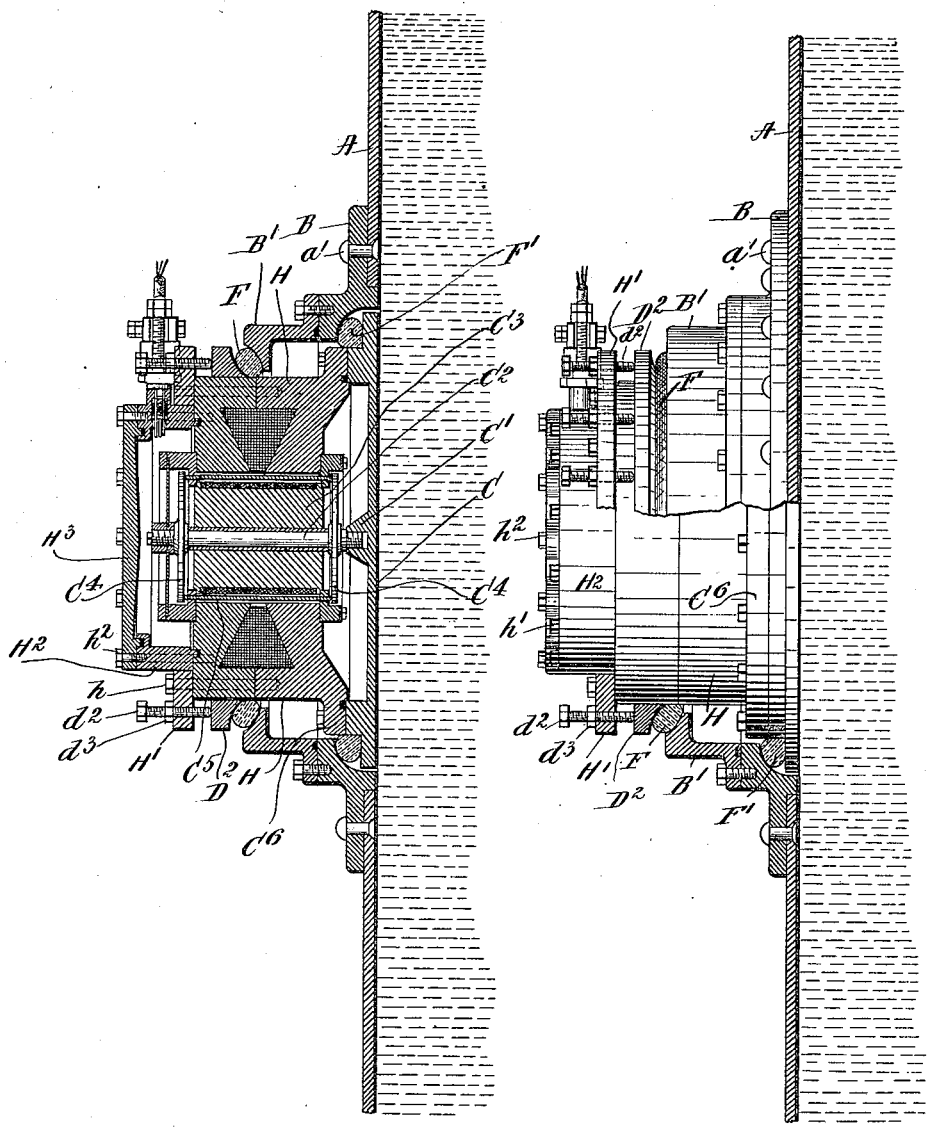

UNITED STATES PATENT OFFICE.

EDWARD C. WOOD, OF SOMERVILLE, AND HAROLD J. W. FAY, OF WESTBORO, MASSA-CHUSETTS, ASSIGNORS TO SUBMARINE SIGNAL COMPANY, OF PORTLAND, MAINE, A CORPORATION OF MAINE.

DIAPHRAGM-MOUNTING.

1,401,024.  Specification of Letters Patent.  Patented Dec. 20, 1921.

Application filed November 12, 1917. Serial No. 201,433.

*To all whom it may concern:*

Be it known that we, EDWARD C. WOOD, of Somerville, in the county of Middlesex and State of Massachusetts, and HAROLD J. W. FAY, of Westboro, in the county of Worcester, in said State, citizens of the United States, have invented a new and useful Improvement in Diaphragm-Mountings, of which the following is a specification.

Our invention relates to the mounting of a diaphragm in the side of a floating body or ship for the receipt of compressional waves which may be utilized to signal from one ship to another or for the reception and detection of sound or other vibrations proceeding upon the ship or the like which it is desirable to detect, as in the case of detecting submarines, etc., it being understood that there is to be used in connection with the diaphragm, mounted as below described, a microphone or other sound-receiving and translating device by which the vibrations of the diaphragm may be translated into electrical vibrations capable of reception upon, for example, a telephone receiver or other indicator.

Our invention will be understood by reference to the drawings in which it is shown in its preferred embodiment and in connection with various instruments for translating the compressional into electrical vibrations and transmitting them to a proper source of reception.

Figure 2:
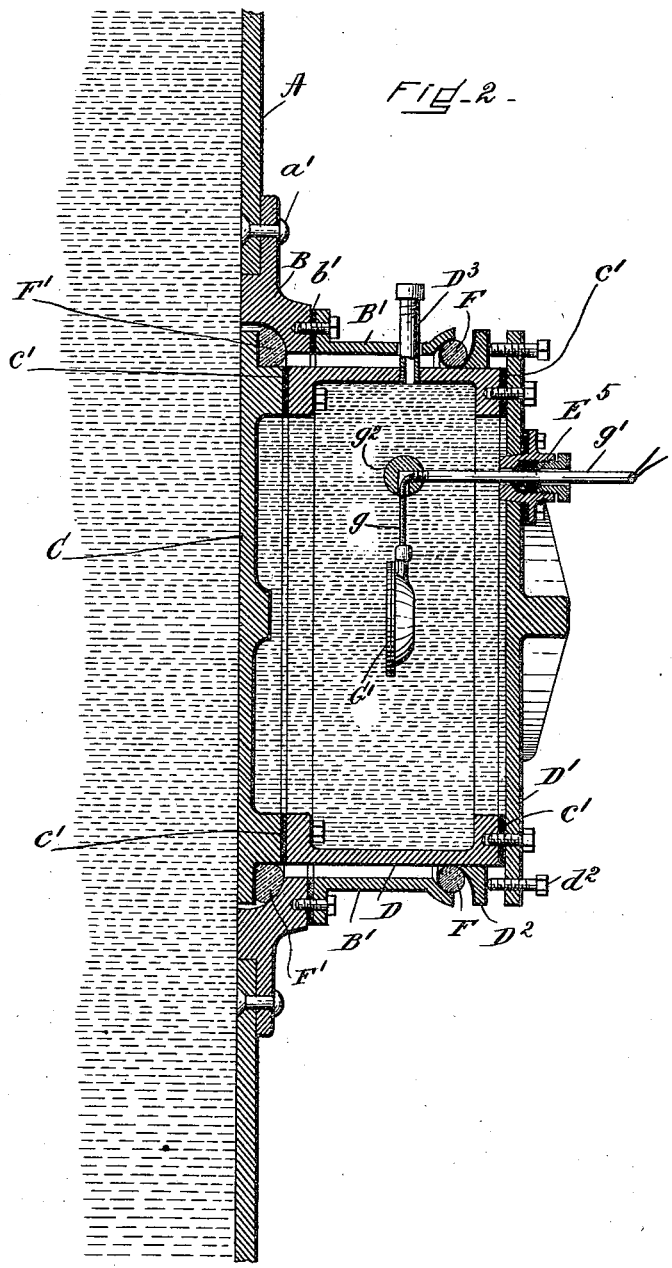
Fig. 2 is a corresponding section of another form of such device.
Figure 3:
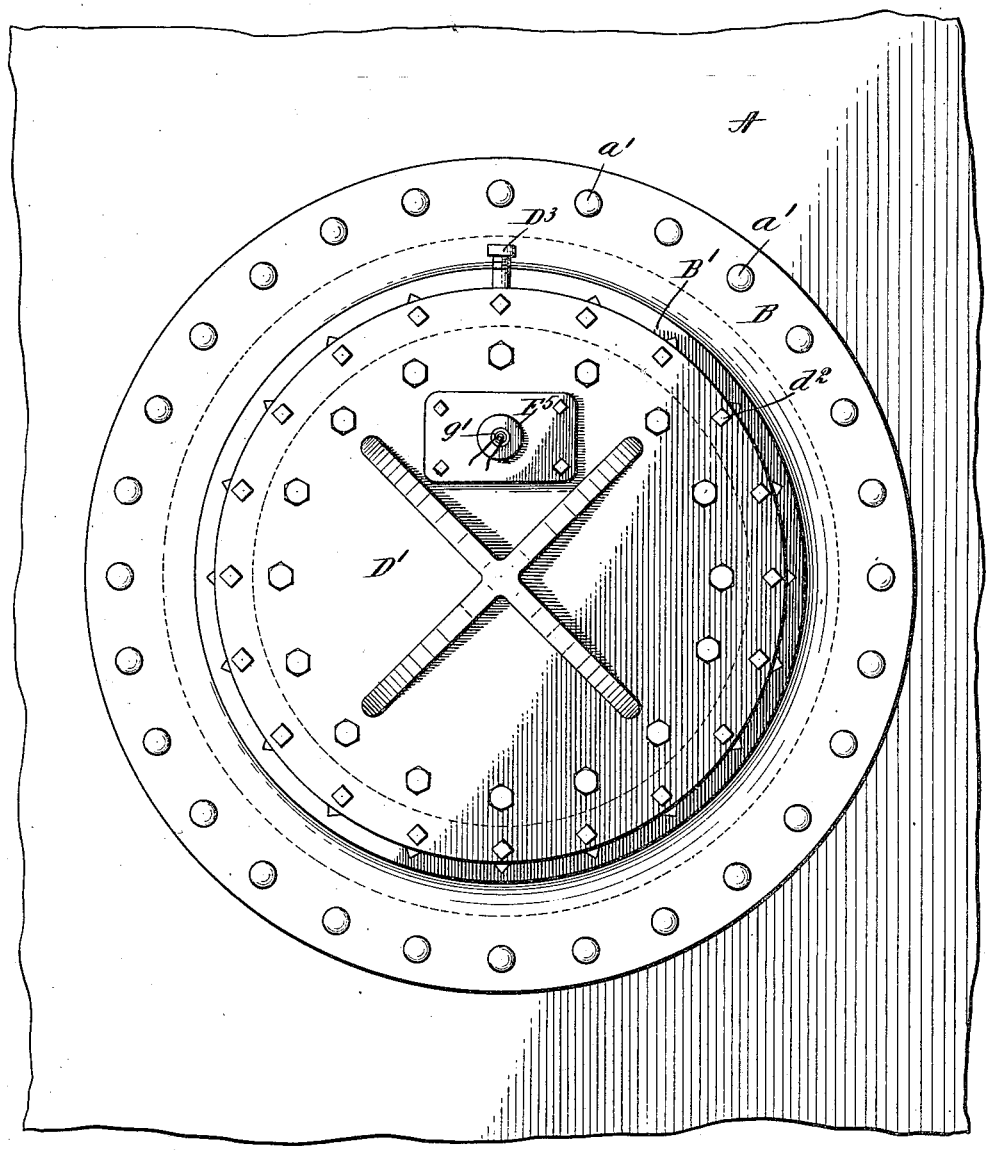

Fig. 3 being a rear elevation of the device shown in Fig. 2.

Figure 6:
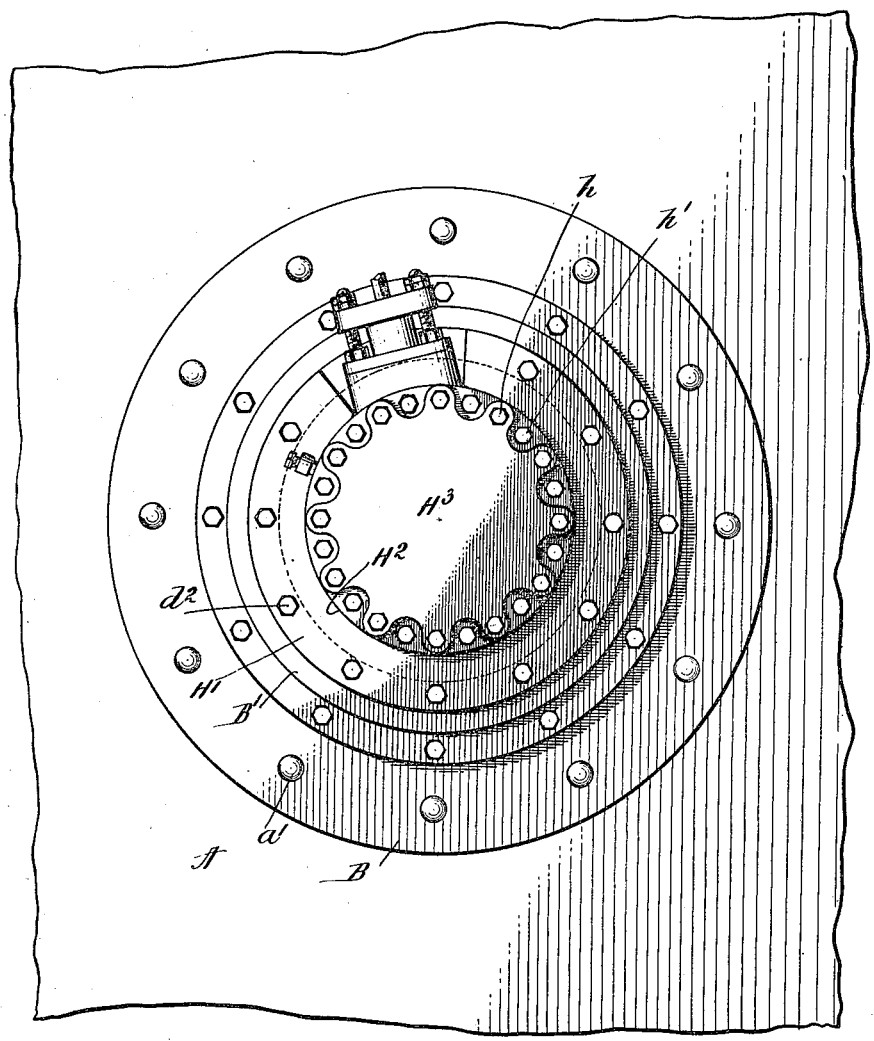

Figs. 4, 5 and 6 show a vertical section and an elevation, partly in section, of another form of utilizing our invention; Fig. 6 being a rear elevation of the apparatus as shown in Fig. 5.

In each of these views A is the ship's wall or skin. In the ship's wall is cut an opening, preferably circular, the edge of which is indicated at $a$. In each case there is inserted in the opening and riveted to the hull at $a^1$ a ring B, which projects inward from the hull and is suitably shaped to provide a support against which the casing or frame holding the diaphragm C may be clamped, a rubber gasket $F^1$ being located between said support and said frame, and in each case there is an extension $B^1$ integral with or bolted as at $b$ to the ring B so as preferably to extend the ring B inward and provide a second surface against which the casing or support for the diaphragm may be clamped, a rubber gasket being located between the extension and the casing, the second support being high enough to center the frame properly and hold it steady. The diaphragm it will be noted is of less diameter than the opening in the ring B and neither it nor the frame supporting it is in contact with the ship's skin nor with the frame-supporting means.

Figure 1:
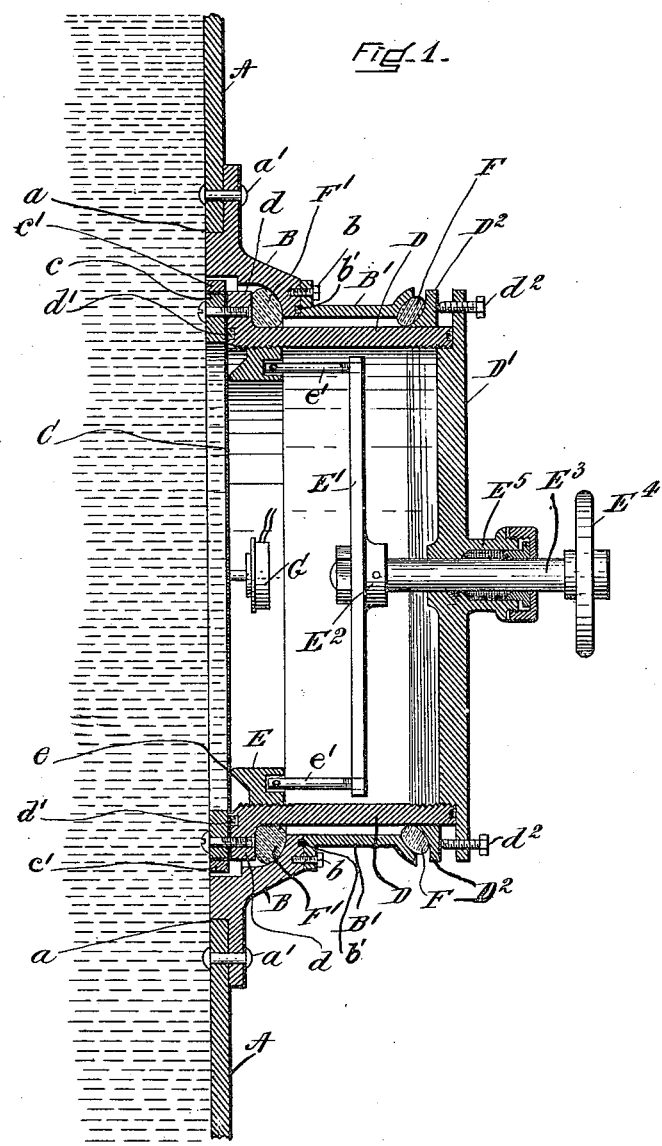
Figure 1 is a section of a device embodying our invention.

In Figs. 1 and 2 the frame for holding the diaphragm C comprises a casing one wall D of which is a cylinder and another wall of which is a disk $D^1$. In the form of our invention shown in Fig. 1 the cylinder D has a flange $d$, which extends outward and which is suitably attached to a ring $c$ between which and the flange $d$ is held the diaphragm C, an outer ring $c^1$ serving to hold the outwardly-bent edge of the diaphragm. At some portion of the joint between the flange $d$ and the diaphragm there is provided a packing $d^1$ to prevent leakage into the interior of the casing.

In Fig. 1 the diaphragm may be tuned in such manner as is described in the application of Edward C. Wood, Serial No. 192,014, filed September 18, 1917, or it may be tuned in the manner shown in Fig. 1 where E is the tuning ring having a bearing surface $e$ which engages the surface of the diaphragm within the casing. The ring E is threaded on its exterior and engages suitable threads on the interior of the cylinder D so that as the ring E is turned it will be advanced against the diaphragm or withdrawn from it, as the case may be. For the purpose of turning the ring a spider $E^1$ is provided having connecting rods $e^1$ which are connected both to the spider and to the ring E. The hub $E^2$ is attached to a shaft $E^3$ carrying a hand-wheel $E^4$ by which the spider and hence the ring E are turned. The shaft $E^3$ passes out through a stuffing box $E^5$ of any convenient construction, so that by rotating the shaft $E^3$ by means of the hand-wheel $E^4$ the tension on the diaphragm C may be either increased or diminished as occasion may require.

The casing comprises the cylinder D, its back wall $D^1$ and the diaphragm C, which are held in place by means of a ring $D^2$ which surrounds the cylinder D. The rear wall $D^1$ of the casing is provided with an overhanging flange through which passes a number of screws $d^2$ which engage the ring $D^2$. Between the ring $D^2$ and the extension $B^1$ of the ring is a rubber washer F and between the flange $d$ and the ring B is a second rubber washer $F^1$, and it will be seen that by screwing the screws $d^2$ a tight joint will be made between the opposing surfaces of the ring $D^2$ and the extension $B^1$ and also between the opposing surfaces of $d$ and B, so that not only will a thoroughly watertight joint be made, but also the diaphragm and its immediate connections will be acoustically insulated from the ship's skin A and hence will receive and transmit sounds coming from without the ship rather than those originating in the ship itself.

For the purpose of transmitting and utilizing the vibrations of the diaphragm, there is shown in Fig. 1 a microphone button G which is attached preferably to the center of the diaphragm, but which will take up the vibrations of the diaphragm and transmit them in the well known way to a proper indicator such as a telephone receiver or galvanometer, etc.

In Fig. 2 there is shown a construction similar to that of Fig. 1 in which, however, the microphone $G^1$ is suspended within a casing formed substantially as in Fig. 1 with, however, gaskets as at $c^1$ in order to maintain the interior of the casing watertight. $D^3$ is a capped inlet through which the interior of the casing may be filled with liquid. The microphone G in this case is suspended by its cable $g$ from an inlet pipe $g^1$ surrounding the cable and passing through a stuffing box $E^5$, which is located in the cover $D^1$ for the casing. This cover $D^1$ may be constructed as shown in Fig. 1, but preferably as shown in Figs. 2 and 3 has cross-ribs for strengthening purposes. We prefer to attach the tubing $g^1$ to a rubber ball $g^2$ through which the cable $g$ passes so as to reduce vibration. $b^1$ in both Figs. 1 and 2 is merely a gasket to insure solid engagement between the ring B and its extension $B^1$.

In Figs. 4, 5 and 6 we have shown a similar construction in which, however, instead of a microphone G or $G^1$ there is used an oscillator of the Fessenden type, as shown and described in Letters Patent No. 1,167,366. In this case the outer wall of the oscillator takes the place of the cylinder D, this outer wall comprising the field magnet H. Instead of the flange carried by the rear wall or cover $D^1$ of the cylinder a ring $H^1$ is bolted to the field magnet H by bolts $h$, and in this case it is desirable to provide the screws $d^2$ with a set nut $d^3$. There is also provided a cylindrical piece $H^2$ which is bolted to the field magnet H by bolts $h^1$, the outer end of the cylindrical piece being closed by a disk $H^3$ which is bolted thereto by bolts $h^2$, this structure providing a chamber for the projecting parts of the oscillator.

As before, the diaphragm is lettered C, but in this case it is provided at its center with a boss $C^1$ having a threaded opening therein into which screws the rod $C^2$, which passes through the core $C^3$ of the oscillator and ties together the disks $C^4$ which engage the ends of the copper tube $C^5$. As this mechanism is fully described in the above-referred-to Letters Patent, its details of construction and operation are not herein disclosed.

The only change in the construction of the oscillator itself from that disclosed in said patent is to provide it with a flange $C^6$ by means of which it is attached to the diaphragm near its outer edge.

It will be seen that while the construction may be modified somewhat, the purpose of this invention is to provide a means whereby a diaphragm and the sound-receiving mechanism used in connection therewith to translate its vibrations into electrical vibrations, may be suspended in an opening in the ship out of contact with the walls or skin of the ship so that it cannot be affected by vibrations other than those which come from outside the ship. It has been found in practice that where an opening has been cut in the wall of a ship and a diaphragm has been riveted to close such an opening, the diaphragm being in operative relation to a microphone or other sound-receiving and transmitting mechanism, the diaphragm is not only affected by the compressional waves reaching it through the water but also by the ship's noises, so that at the telephone receiver there is sometimes considerable confusion of sound, from which it is hard to pick out any special signal expected. So far as we know, no construction has as yet been discovered wherein an opening has been cut in the wall of the ship and a diaphragm suspended therein in such a way as to be acoustically insulated from the wall of the ship and thus be capable of receiving and transmitting to a microphone or other receiving device in proper relation therewith the sounds which come from outside the ship and which it is especially desired to receive.

The means for attaching the diaphragm as shown are simple and effective, but we do not mean to limit ourselves to these means.

It will be noted that the rubber rings which lie between the ring or other extension or connection to the ship's skin serve not only to keep out the water, but also to take up the jar or other vibration caused in the ship by the operation of its engine or otherwise, but other arrangements of such rings or gaskets and other forms of construction may also be made without departing from the spirit of our invention as referred to in our claims.

It will also be noted that in one of the three forms of the invention shown the casing contains a liquid and the microphone is not in direct contact with the diaphragm. It is well understood, however, that a microphone when so located is in operative relation to the diaphragm; that is to say, the vibrations of the diaphragm will be taken up by the microphone.

We have used the term "floating body" in connection with this invention, but have more emphatically referred to its use in connection with a ship. We mean by "floating body" to include a ship, a submarine, a body whether floating or submerged, or any other body useful in navigation having a wall in which it may be desirable to insert a diaphragm in order to secure a signal or other intelligence from an outside point.

What we claim as our invention is:—

A floating body having an opening in the skin therof, a diaphragm, a casing having a flange, and means adapted to clamp said diaphragm to said flange to close one end of said casing, said diaphragm and said diaphragm-clamping means being of less diameter than said opening, and means for supporting said diaphragm and said casing in said opening comprising a surrounding member attached to said floating body and shaped to overhang the flange of said casing and carrying a shoulder, a resilient packing located between said overhang and said flange, a second resilient packing located on said shoulder, and means engaging said second packing for adjustably clamping said casing to said surrounding member.

EDWARD C. WOOD.
HAROLD J. W. FAY.